United States Patent [19]

MacDowell

[11] Patent Number: 4,605,443

[45] Date of Patent: Aug. 12, 1986

[54] CAO-AL$_2$O$_3$-SIO$_2$ GLASS HYDRAULIC CEMENTS

[75] Inventor: John F. MacDowell, Painted Post, N.Y.

[73] Assignee: Corning Glass Works, Corning, N.Y.

[21] Appl. No.: 695,355

[22] Filed: Jan. 28, 1985

[51] Int. Cl.$^4$ ............................................. C04B 7/32
[52] U.S. Cl. ...................................... 106/104; 501/73
[58] Field of Search ........................... 106/104; 501/73

[56] References Cited

U.S. PATENT DOCUMENTS

| | | | |
|---|---|---|---|
| 3,147,129 | 9/1964 | Armstrong et al. | 106/104 |
| 4,217,143 | 8/1980 | Reich et al. | 106/100 |
| 4,438,212 | 3/1984 | Potter et al. | 501/73 |

FOREIGN PATENT DOCUMENTS

| | | | |
|---|---|---|---|
| 259203 | 1/1927 | United Kingdom | 106/104 |
| 908073 | 10/1962 | United Kingdom | 106/104 |
| 1220410 | 1/1971 | United Kingdom | 106/104 |

Primary Examiner—William R. Dixon, Jr.
Assistant Examiner—Steven Capella
Attorney, Agent, or Firm—C. S. Janes, Jr.

[57] ABSTRACT

This invention relates to the preparation of hydraulic cements consisting essentially of glasses having compositions within area ABCDEA of FIG. 1 which, when contacted with water, hydrate to form strong, low porosity cements having crystals composed predominantly of hydrogarnet solid solution and/or hydrogehlenite.

4 Claims, 2 Drawing Figures ated # CAO-AL$_2$O$_3$-SIO$_2$ GLASS HYDRAULIC CEMENTS

BACKGROUND OF THE INVENTION

Calcium aluminate hydraulic cements were first prepared in Europe during the latter part of the nineteenth century. Although developed initially to take advantage of their chemical resistance to sulfate, saline, and low pH solutions, the primary property which distinguishes calcium aluminate cements from common portland cement (calcium silicate-based) is their much more rapid rate of strength development. For example, typical times for maximum strength development are on the order of several days for portland cement in comparison with several hours for high alumina compositions.

In the 1920's it was discovered that mortars and concretes prepared with a calcium aluminate cement and a refractory aggregate such as alumina or fireclay, did not crack or spall during repeated firings, and could withstand temperatures in the range of about 1400°–1700° C. Those characteristics, in conjunction with good field workability (castability), high hot and cold strength, and rapid hardening, have led to a castable refractories industry which today constitutes the principal application for high alumina, calcium aluminate cement concretes. The steel, glass, non-ferrous, and ceramics industries are major users.

From the post World War II period to the late 1960's, high alumina, calcium aluminate cement concretes were utilized increasingly for load bearing, pre-cast beams and slabs. Inasmuch as the time to achieve maximum strength was substantially reduced with those cements, overall fabrication costs were lower than with portland cement. This rapidly expanding industry came to an abrupt end, however, when, in a period of ten years from the early 1960's to the early, 1970's, several catastrophic building collapses occurred on the European continent. Extensive investigations into those disasters traced the structural failures to a gradual, but drastic, weakening of the cement concrete through a process now termed "conversion". As a direct result of those investigations, high alumina, calcium aluminate cement has been banned for structural applications in virtually every country in the world.

The sequence of chemical reactions underlying the conversion of metastable hydrates (principally CaO·Al$_2$O$_3$·10H$_2$O and 2 CaO·Al$_2$O$_3$·8H$_2$O) to the stable hydrate (3CaO·Al$_2$O$_3$·6H$_2$O+Al$_2$O$_3$·3H$_2$O) generally proceeds as follows:

(1) CaO·Al$_2$O$_3$ (cement)+10H$_2$O→CaO·Al$_2$O$_3$·10H$_2$O
(2) 2(CaO·Al$_2$O$_3$·10H$_2$O)→2CaO·Al$_2$O$_3$·8H$_2$O+Al$_2$O$_3$·3H$_2$O+9H$_2$O
(3) 3(2CaO·Al$_2$O$_3$·8H$_2$O)→2(3CaO·Al$_2$O$_3$·6H$_2$O)[Hydrogarnet]+2(Al$_2$O$_3$·3H$_2$O)[Gibbsite]+6H$_2$O In conformity with the standard abbreviations of the cement chemist, the following symbols will be employed hereinafter:

C=CaO; A=Al$_2$O$_3$; S=SiO$_2$; H=H$_2$O

When it is appreciated that there is a decrease in specific volume of over 50% (excluding H$_2$O) during the transformation of CAH$_{10}$ to C$_3$AH$_6$, it is quite apparent that the observed weakening phenomenon is effected primarily through an increase in porosity occurring during the conversion process.

The hydrogarnet structure is the sole calcium aluminate hydrate recognized to be stable under ambient conditions. That phase occurs in nature as "hydrogrossular" (C$_3$AH$_6$) and is isostructural with cubic grossular(ite) (C$_3$AS$_3$) garnet. A hydrothermal-x-ray study of the hydrogrossular-grossular garnet series has indicated that a continuous solid solution series exists between C$_3$AH$_6$ and C$_3$AS$_3$ with the general formula C$_3$AS$_x$H$_{(6-2x)}$. A substitution of 4H+ ions for the Si$^{+4}$ ion in the SiO$_4$ tetrahedron comprises the mechanism to drive that solid solution.

SUMMARY OF THE INVENTION

The fast setting characteristic of tricalcium aluminate (3CaO—Al$_2$O$_3$) has been utilized for many years to promote a quicker set in portland cement. Hence, additions of up to 15% of C$_3$A are routinely incorporated to provide the "first set" in common silicate cement concrete. The present invention was initiated by the question of whether, starting with a C$_3$A-based composition instead of a CA-based composition, it would be possible to form C$_3$AH$_6$—C$_3$AS$_3$ solid solution compounds directly, i.e., without conversion from the unstable superhydrate phases. The present research indicates that the question is answerable in the affirmative. Thus, very stable cements can be prepared from glasses and glass-ceramics having compositions within area ABCDEA of the CaO—Al$_2$O$_3$—SiO$_2$ ternary composition diagram comprising FIG. 1. In that FIGURE, Point A represents 51% CaO, 27% SiO$_2$, 22%, Al$_2$O$_3$; Point B represents 54% CaO, 20% SiO$_2$, 26% Al$_2$O$_3$; Point C represents 54% CaO, 12% SiO$_2$, 34% Al$_2$O$_3$; Point D represents 47% CaO, 12% SiO$_2$, 41% Al$_2$O$_3$; and Point E represents 42% CaO, 22% SiO$_2$, 36% Al$_2$O$_3$.

Inasmuch as the cements consist of very finely-divided glass particles, preparation involves three general steps: (1) a batch for a glass of a desired composition is melted; (2) the glass melt is cooled sufficiently rapidly to form a glass body; and (3) the glass body is comminuted to very finely-divided particles, customarily passing a No. 200 United States Standard Sieve (74 microns) to yield an average particle size of about 15–20 microns.

As has been explained above, the most stable hydrate formed during water curing of calcium aluminate cements is C$_3$AH$_6$. However, when the CaO:Al$_2$O$_3$ ratio is in the vicinity of 1:1 or lower, as in the case with most commercial calcium aluminate cements, intermediate unstable hydrates form readily during water curing. This study of cements formed from glasses containing high ratios of CaO:Al$_2$O$_3$ determined that the formation of C$_3$AH$_6$ (and its solid solutions with SiO$_2$) can occur directly during curing without producing substantial quantities of the unstable hydrates. When C$_2$AH$_8$ is detected, for example, it is typically during the very early stages of hydration (pre-set) and then only in minor amounts.

Most of the cements produced by the present invention contain a mixture of C$_3$AH$_6$ and C$_2$ASH$_8$. C$_2$ASH$_8$, commonly called gehlenite hydrate or hydrogehlenite, has a layered structure consisting of hexagonal or pseudohexagonal unit cells. It is occasionally observed as a minor phase in cements prepared from blast furnace slag. As the inventive compositions are varied from the lowest SiO$_2$ content (12%) to the highest level (27%), the ratio of hydrogarnet:hydrogehlenite decreases from over 10 to less than about 0.1. The times required for setting of the cements increase from a few minutes to several hours.

Hence, not only is the formation of unstable hydrates avoided in the inventive compositions, but also the setting times of the cements can be rather precisely adjusted through control of glass composition with consequent control of the ratio hydrogarnet:hydrogehlenite in the cement.

Perhaps more than any other single property, the normally high porosity of cement (20-30%) has severely limited its applications. Thus, the ingress and egress of water and alkaline solutions through the cement structure not only render it soluble, but also cause rapid corrosion of embedded steel reinforcements resulting in loss of structural integrity.

Recently, various researchers have observed compressive strength values exceeding 20,000 psi on low porosity cements which were prepared with careful attention to one or more of the following: (1) particle packing; (2) the use of high shear mixing; (3) low water:cement ratios (frequently <0.2); and (4) curing under applied stress. Also, about 5-10% of an organic polymer such as polyvinyl acetate has frequently been incorporated by those investigators to improve strength and toughness.

Cements have been prepared from a narrow range of the present inventive compositions exhibiting very low porosities, i.e., as low as 2%, and compressive strengths in the vicinity of 20,000 psi (~40-45% CaO, 15-18% $SiO_2$, 34-37% $Al_2O_3$), wherein hydrogehlenite comprises the principal crystal phase. Of particular interest is the fact that no special mixing techniques or additions are required to achieve these properties. Furthermore, conventional water:cement ratios of 0.4-0.5 are quite applicable.

The substitution of up to 35 mole percent total of $TiO_2$ and/or $ZrO_2$ for $SiO_2$ and/or $Al_2O_3$ may advantageously be undertaken to reduce porosity and improve the mechanical strength of the cements.

DESCRIPTION OF PREFERRED EMBODIMENTS

Figure 1:
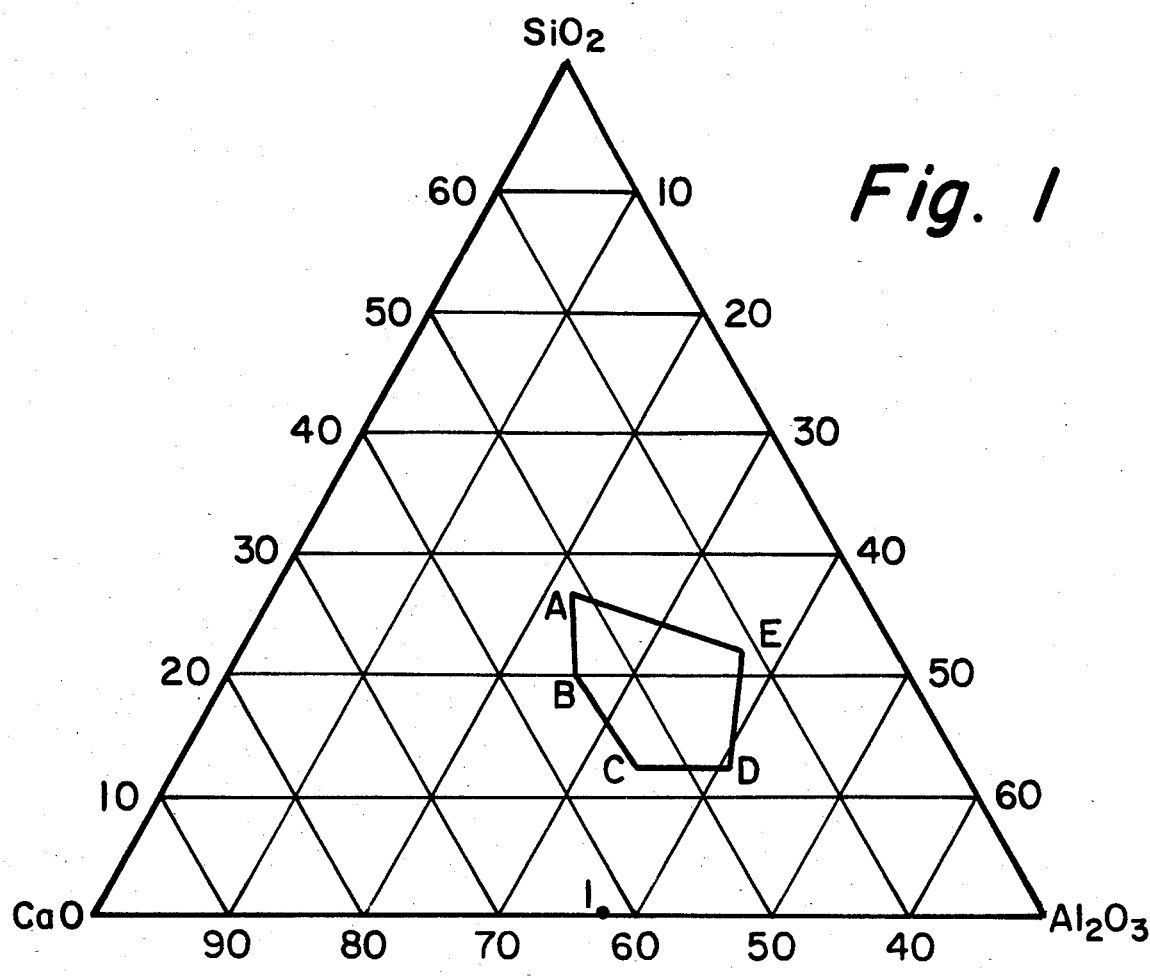
FIG. 1 comprises a ternary composition diagram of the CaO—$SiO_2$—$Al_2O_3$ system in weight percent illustrating compositions operable in producing the desired cements.
Figure 2:
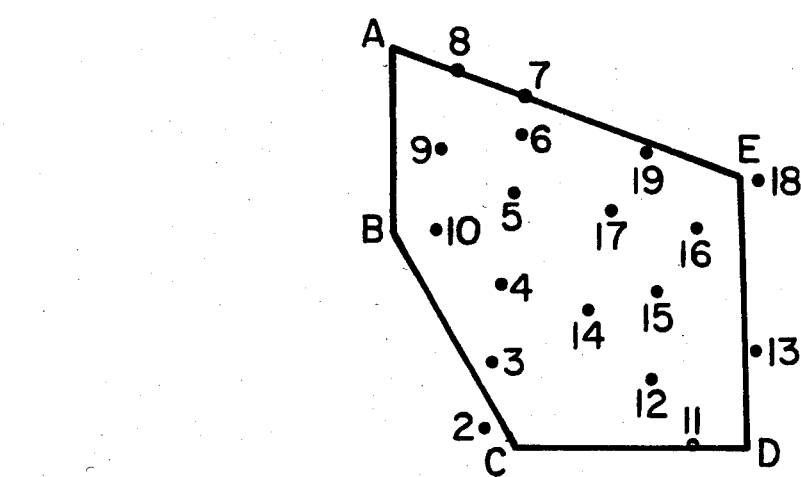
FIG. 2 comprises an enlargement of Area ABCDEA in FIG. 1.

Table I records a group of glass compositions, expressed in terms of parts by weight on the oxide basis and designated in the appended drawing, evaluated to illustrate the parameters of the instant invention. Inasmuch as the sum of the individual compositions totals or closely approximates 100, for all practical purposes the values recited may be deemed to represent percent by weight. The actual batch ingredients may comprise any materials, either oxides or other compounds, which, when melted together, will be converted into the desired oxide in the proper proportions. In the examples reported in Table I, the batch ingredients consisted of sand, alumina, limestone, $TiO_2$, and $ZrO_2$. Table I also reports the mole ratio of $SiO_2$:$Al_2O_3$:CaO (S:A:C) in each composition.

The batch constituents were compounded, dry ball-milled to aid in obtaining a homogeneous melt, and charged into platinum-rhodium crucibles. The crucibles were introduced into a furnace operating at 1650° C. and the batches melted for two hours. The melts were then poured between water cooled steel rollers to form a thin ribbon which was thereafter crushed and dry ballmilled to pass a No. 200 United States Standard Sieve.

TABLE I

| | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | — | 12.9 | 15.0 | 18.2 | 21.7 | 23.4 | 25.0 | 26.0 | 23.2 | 20.0 | 12.0 | 14.7 | 15.7 |
| $Al_2O_3$ | 37.7 | 32.9 | 32.0 | 30.9 | 29.5 | 28.9 | 28.3 | 25.3 | 26.3 | 27.5 | 40.0 | 37.4 | 40.1 |
| CaO | 62.3 | 54.2 | 53.0 | 51.0 | 48.7 | 47.7 | 46.7 | 48.7 | 50.6 | 52.5 | 48.0 | 48.0 | 44.1 |
| $TiO_2$ | | | | | | | | | | | | | |
| $ZrO_2$ | | | | | | | | | | | | | |
| S:A:C | 0:1:3 | 0.67:1:3 | 0.8:1:3 | 1:1:3 | 1.25:1:3 | 1.38:1:3 | 1.5:1:3 | 1.75:1:3.5 | 1.5:1:3.5 | 1.2:1:3.4 | 0.5:1:2.2 | 0.7:1:2.3 | 0.7:1:2 |

| | 14 | 15 | 16 | 17 | 18 | 19 | 20 | 21 |
|---|---|---|---|---|---|---|---|---|
| $SiO_2$ | 17.0 | 17.7 | 20.0 | 21.0 | 21.9 | 23.0 | 16.1 | 18.5 |
| $Al_2O_3$ | 34.0 | 36.1 | 36.0 | 33.0 | 37.2 | 33.0 | 35.1 | 35.0 |
| CaO | 49.0 | 46.2 | 44.0 | 46.0 | 40.9 | 44.0 | 42.8 | 42.3 |
| $TiO_2$ | — | — | — | — | — | — | 5.5 | — |
| $ZrO_2$ | — | — | — | — | — | — | — | 4.2 |
| S:A:C | 0.85:1:2.6 | 0.83:1:2.33 | 0.8:1:2.25 | 1.1:1:2.5 | 1:1:2 | 1.2:1:2.4 | 0.8:1:2.2:0.2 $TiO_2$ | 0.9:1:2.2:0.1 $ZrO_2$ |

Routine qualitative evaluations of cements were made by blending 25 grams of anhydrous powder with 10 ml water (equivalent to a water:cement weight ratio of 0.4) using a spatula in a polyethylene dish. Cement patties about 2"×2"×3/16" were shaped and cured overnight in a humidity chamber at 90% relative humidity and 25° C. The patties were removed from the chamber and allowed to cure another 48-144 hours under ambient conditions. The samples were broken manually using finger pressure; a relative figure of merit being assigned depending upon the amount of pressure required to fracture the cement squares. On a ranking of 1-10, 5 was deemed to constitute the minimum satisfactory strength. Values of less than 5 were considered too weak for practical use. A value of 10 indicates that the sample could not be broken with finger pressure.

Compressive strengths were measured on the more promising compositions in accordance with the following procedure:

(1) pellets having a diameter of 0.5-1.0" and a length of about 0.75-1.5" were formed from 25-75 grams of anhydrous cement with a 0.2-0.4 water:cement ratio;

(2) the hydrated pellets were cured overnight in a humidity chamber (90% relative humidity, 25° C.);

(3) the pellets were removed from the humidity chamber and allowed to cure for 72 hours in the ambient environment; and (4) the pellets were broken under axial compression.

X-ray diffraction analyses and scanning electron microscopy were performed to aid in understanding the microstructure of the cements.

Table II reports comparative strength (Com. Str.) ratings on the above patties and compressive strengths (Comp. Str.) measured on selected compositions in terms of psi (×1000). Table II also records the time in minutes required for the cement to initially set, the percent porosity (Por.), and the major crystal phases (Cryst.) identified in selected examples in the order of the amount present. The parentheses around a particular crystal phase indicates the presence of a very small quantity of the crystal phase. Example 1 set too fast to be of any practical utility. Examples 7 and 18 did not crystallize but remained amorphous (Amor.).

TABLE II

| Ex. | Com. Str. | Comp. Str. | Set | Por. | Cryst. |
|---|---|---|---|---|---|
| 1 | — | — | <0.1 | — | $C_3AH_6$ |
| 2 | 5 | 13 | 1 | — | $C_3AH_6$ |
| 3 | 5 | 11 | 3 | 27.4 | $C_3AH_6$, ($C_2ASH_8$) |
| 4 | 7 | — | 6 | — | $C_3AH_6$, $C_2ASH_8$ |
| 5 | 9 | — | 100 | — | $C_2ASH_8$, $C_3AH_6$ |
| 6 | 8 | — | 250 | — | $C_2ASH_8$, ($C_3AH_6$) |
| 7 | 2 | — | — | — | None |
| 8 | 5 | — | — | — | $C_2ASH_8$ |
| 9 | 7 | — | — | — | $C_2ASH_8$ |
| 10 | 7 | — | 18 | — | $C_2ASH_8$, ($C_3AH_6$) |
| 11 | 6 | 12 | 2 | 25.3 | $C_3AH_6$, $C_2ASH_8$ |
| 12 | 7 | 14 | 5 | 20.7 | $C_3AH_6$, $C_2ASH_8$ |
| 13 | 2 | — | — | — | $C_2ASH_8$, ($C_3AH_6$) |
| 14 | 5 | 11 | 7 | — | $C_3AH_6$, $C_2ASH_8$ |
| 15 | 9 | — | 45 | 11.5 | $C_2ASH_8$, ($C_3AH_6$) |
| 16 | 6 | 16 | 45 | — | $C_2ASH_8$ |
| 17 | 5 | — | 200 | 16.4 | $C_2ASH_8$, $C_3AH_6$ |
| 18 | 1 | — | — | — | None |
| 19 | 4 | — | — | — | — |
| 20 | 10 | 19 | >120 | 5.6 | $C_2ASH_8$ |
| 21 | 10 | — | >75 | 1.6 | $C_2ASH_8$ |

As can be observed from a study of Tables I and II, compositions containing less than about 45% CaO and more than about 25% $SiO_2$ exhibit little hydraulic activity. Above about 55% CaO and less than about 10% $SiO_2$, the glass powders react so rapidly that complete mixing with water before hardening is impossible. The samples are often so exothermic that a substantial amount of steam is liberated. When conventional retarding agents such as sucrose or NaCl are employed to slow hydraulic activity, the cements are generally weak after curing. Cements containing less than about 6% $SiO_2$ and less than about 40% CaO comprise the high $Al_2O_3$ compositions characteristic of many commercial refractory cements. The cements are typically fairly rapid setting and hydrate initially to $CAH_{10}$ and/or $C_2AH_8$. Conversion to $C_3AH_6+AH_3$ occurs as a function of time and temperature and is responsible for the basic instability of these compositions. Above about 6% $SiO_2$, the cements are considerably weaker, thereby explaining the reason most commercial calcium aluminate cement composition specifications limit $SiO_2$ to about 6%.

The compositions below about 20% $SiO_2$ appear to hydrate principally to hydrogarnet, i.e., $C_3AH_6$, from $C_{2-3}AS_x$-based glasses. Cement setting times are rapid, about 1–45 minutes, and short exotherms produce high temperatures during curing. The hydrogarnet phase contains some $SiO_2$ in solid solution which has been estimated as up to about 0.75 moles/unit formula hydrogarnet, i.e., about 11 weight percent $SiO_2$. In essence, then, the hydrogarnet formed is actually a $C_3AH_6$—$C_3AS_3$ solid solution phase. Increasing amounts of hydrogehlenite, $C_2ASH_8$, are found with hydrogarnet as the $SiO_2$ approaches 20%.

The compositions above about 20% $SiO_2$ appear to hydrate principally to $C_2ASH_8$ and exhibit setting times from about 20 to over 200 minutes. The cements are dense and strong and mortars prepared therefrom (1 part water/2 parts cement/4 parts sand) exhibit good strength also, thereby indicating good aggregate bonding properties.

Compositions containing approximately 20% $SiO_2$ hydrate to a combination of $C_3AH_6$ solid solution and $C_2ASH_8$ in about equal proportions. This mixture of phases enables the setting times of the final cement to be closely regulated from a few minutes to several hours, since the amount of $C_2ASH_8$ (relatively slow setting) and the amount of $C_3AH_6$ solid solution (relatively fast setting) can be varied by controlling the initial glass composition. Hence, the setting times of a cement can be particularly designed to serve a specific application.

Differential thermal analyses have indicated that the thermal stability of the hydrogarnet solid solution is greater than that of the hydrogehlenite. The endotherm for hydrogehlenite is observed at about 170° C. compared to about 370° C. for the hydrogarnet solid solution. Heating the hydrogehlenite for 72 hours at 105° C. caused virtually total dehydration thereof, whereas a like exposure of the hydrogarnet solid solution resulted in little, if any, decomposition thereof. It was found that the hydrogarnet solid solution cements could be fired for one hour at 250° C. with no perceptible dehydration occurring.

The chemical durability (expressed in terms of powder weight loss) was measured on several of the hydrated cement compositions recorded in Table I and those values are reported in Table III. The data are provided in terms of $mg/cm^2$ weight loss upon exposure to distilled water, weak acid (0.002N $HNO_3$), and weak base (0.02N $Na_2CO_3$). The surface areas of the cement powders ranged between about 2.5–5 $m^2/g$.

TABLE III

| Example | Water | 0.002N $HNO_3$ | 0.02N $Na_2CO_3$ |
|---|---|---|---|
| 3 | 0.0040 | 0.0038 | 0.0037 |
| 11 | 0.0040 | 0.0038 | 0.0032 |
| 12 | 0.0036 | 0.0034 | 0.0033 |
| 14 | 0.0025 | 0.0027 | 0.0028 |
| 15 | 0.0045 | 0.0191 | 0.0057 |
| 17 | 0.0022 | 0.0160 | 0.0029 |

As can be observed in Table III, the powder weight loss in water and in an alkaline environment was quite low for all the cements tested. Some, however, appeared to be more resistant to acids than others. To illustrate, the hydrogarnet solid solution-rich composition (Example 3) demonstrated very good acid durability, whereas the hydrogehlenite-rich composition (Example 15) is less resistant. Nevertheless, the overall chemical durability of the cements strongly recommends their use in mildly corrosive environments such as are encountered in architectural and consumer products.

To investigate the presence of any differences that might exist between cements made from glass and those prepared from crystalline bodies, a group of glasses from those listed in Table I was crystallized in situ by heating from about 1000°–1100° C. for several hours. Three general conclusions were drawn from a comparison of cements produced from crystallized glasses and those formed from amorphous glasses:

(a) the crystalline cements having $SiO_2$ contents below about 15% reacted with water at a somewhat more rapid rate;

(b) crystalline cements containing more than about 15% $SiO_2$ exhibited drastically reduced hydraulic activity when compared to the glassy cements; hence, the glassy cements were stronger and developed their strength more rapidly; and (c) the crystalline cements evidenced a greater tendency to develop unstable hydrates, e.g., $C_2AH_8$, particularly in those compositions having mole ratios $CaO:Al_2O_3$ below 2.5.

Besides the greater reactivity of most glasses in the region of the inventive compositions, the major advantage of utilizing a glassy starting material is the avoidance of the gross compositional and structural inhomogeneities associated with crystalline materials, such as anisotropy, crystal size, shape, reactivity, cleavage, hardness, imperfections, etc. Furthermore, the cost required to comminute glass to very finely-divided particles is normally less than for its crystalline counterpart.

In summary, two distinct preferred composition ranges have been found which yield hydrated structures with the lowest internal porosities and the highest compressive and flexural strengths. The first composition area approximates the $C_3A$—$SiO_2$ join from about 20–24% $SiO_2$. Examples 5 and 6 lie within that region. The second preferred composition regime is bounded between about 16–21% $SiO_2$, 35–38% $Al_2O_3$ and 43–47% CaO. Examples 15 and 16 are illustrative of such compositions. The major crystal phase in both of those composition fields is hydrogehlenite.

It has also been determined that certain metal oxide additions can enhance the strength and reduce the porosity of the ternary glass cement compositions; especially is this so within the second preferred composition region described above. Examples 20 and 21 illustrate that $TiO_2$ and $ZrO_2$ are particularly effective in improving strength and decreasing porosity of the cements. Substitution of those oxides for either $SiO_2$ or $Al_2O_3$ appears to be equally effective. Other oxides found to exert similar effects within that composition region, but not as substantial as those caused by $TiO_2$ and/or $ZrO_2$, include $SnO_2$, $CeO_2$, and $Fe_2O_3$.

Finally, it will be appreciated that the inventive cements can be mixed with various reactive fillers such as gypsum, plaster of Paris, portland cement, and anhydrite to form strong structural bodies.

I claim:

1. A hydraulic cement comprising a glass consisting essentially of a composition included within area ABCDEA of FIG. 1.

2. A hydraulic cement according to claim 1 which, when contacted with water, hydrates to form crystals composed predominantly of hydrogarnet solid solution and/or hydrogehlenite with essentially no subsequent conversion.

3. A hydraulic cement according to claim 1 exhibiting exceptionally high strength and low internal porosity having a composition approximating the $C_3A$—$SiO_2$ join from about 20–24% $SiO_2$ which, when contacted with water, hydrates to form crystals composed predominantly of hydrogehlenite.

4. A hydraulic cement according to claim 1 exhibiting exceptionally high strength and low internal porosity having a composition consisting essentially of about 16–21% $SiO_2$, 35–38% $Al_2O_3$, and 43–47% CaO which, when contacted with water, hydrates to form crystals composed predominantly of hydrogehlenite.

* * * * *